Feb. 1, 1927.
J. T. REDDING
1,615,883
CALCULATOR
Filed May 12, 1926
4 Sheets-Sheet 1
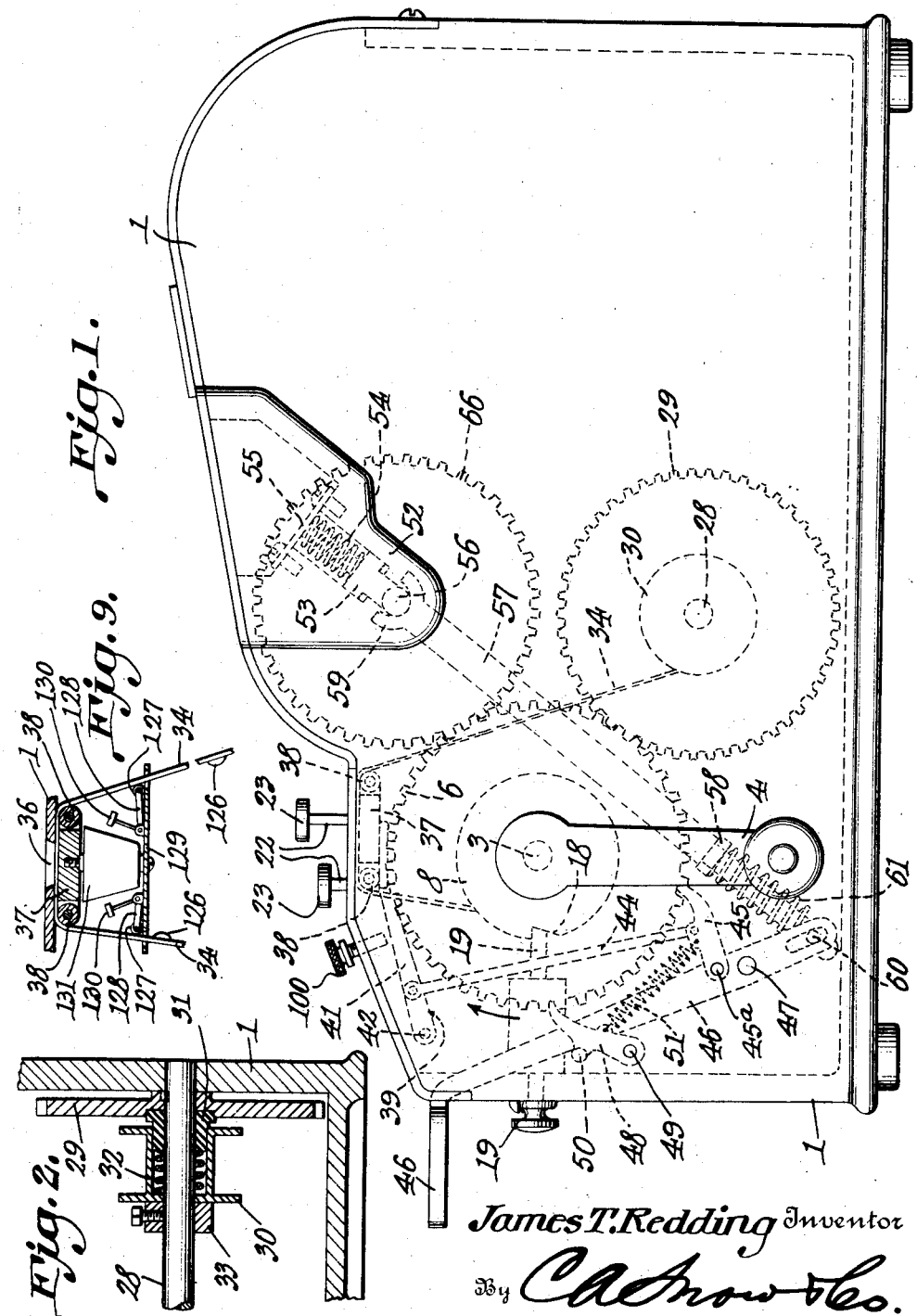
James T. Redding Inventor
By C.A.Snow & Co.
Attorneys

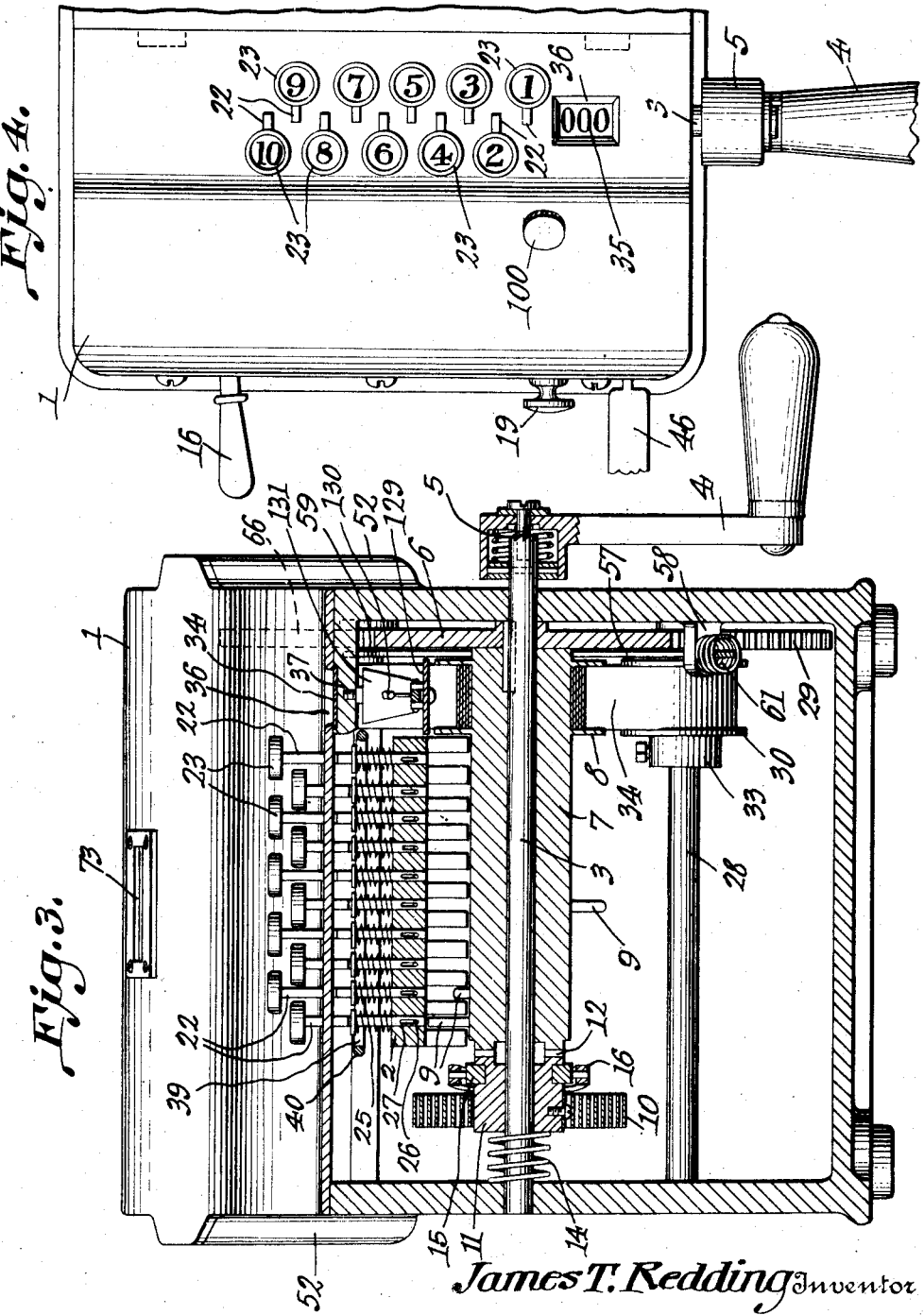

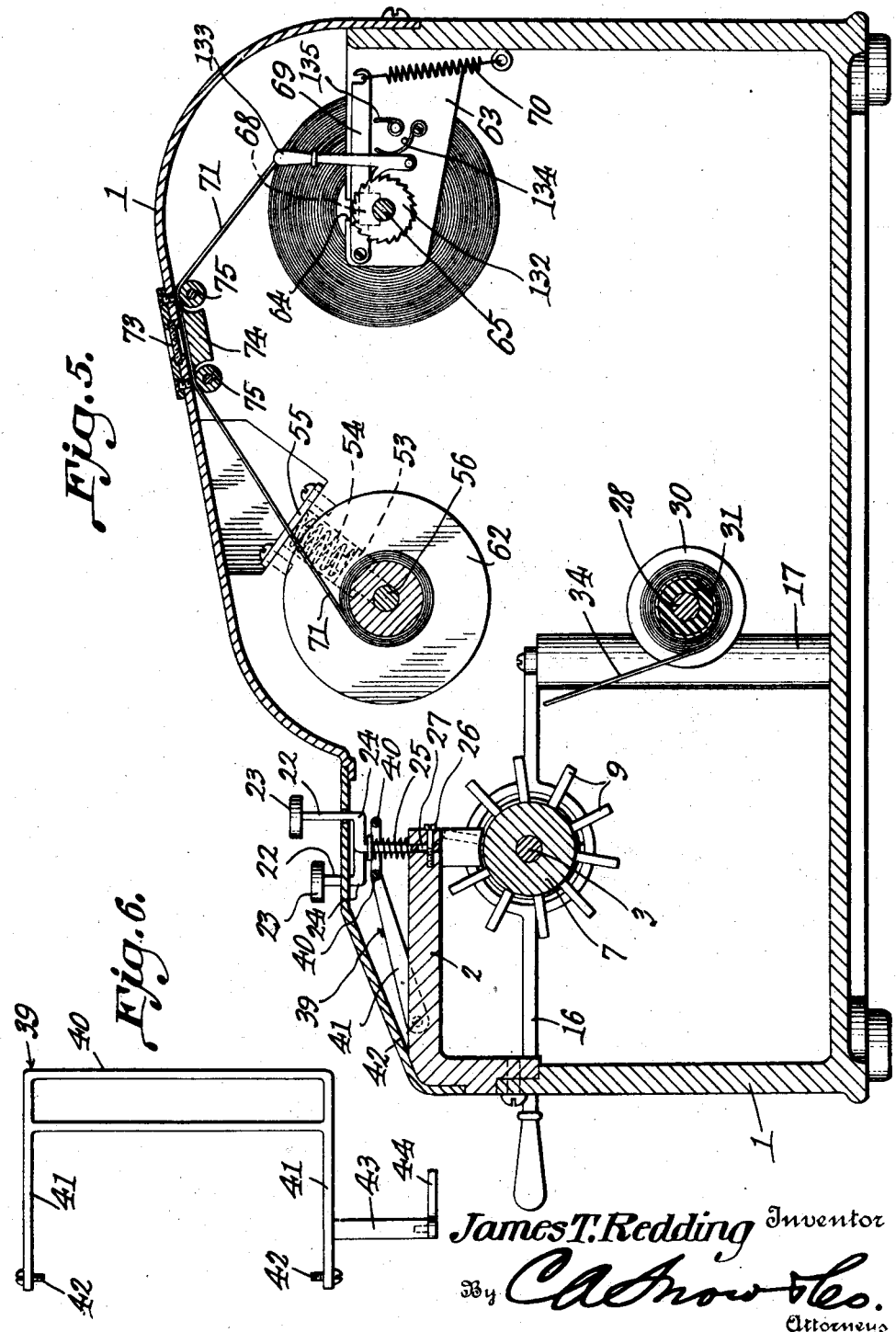

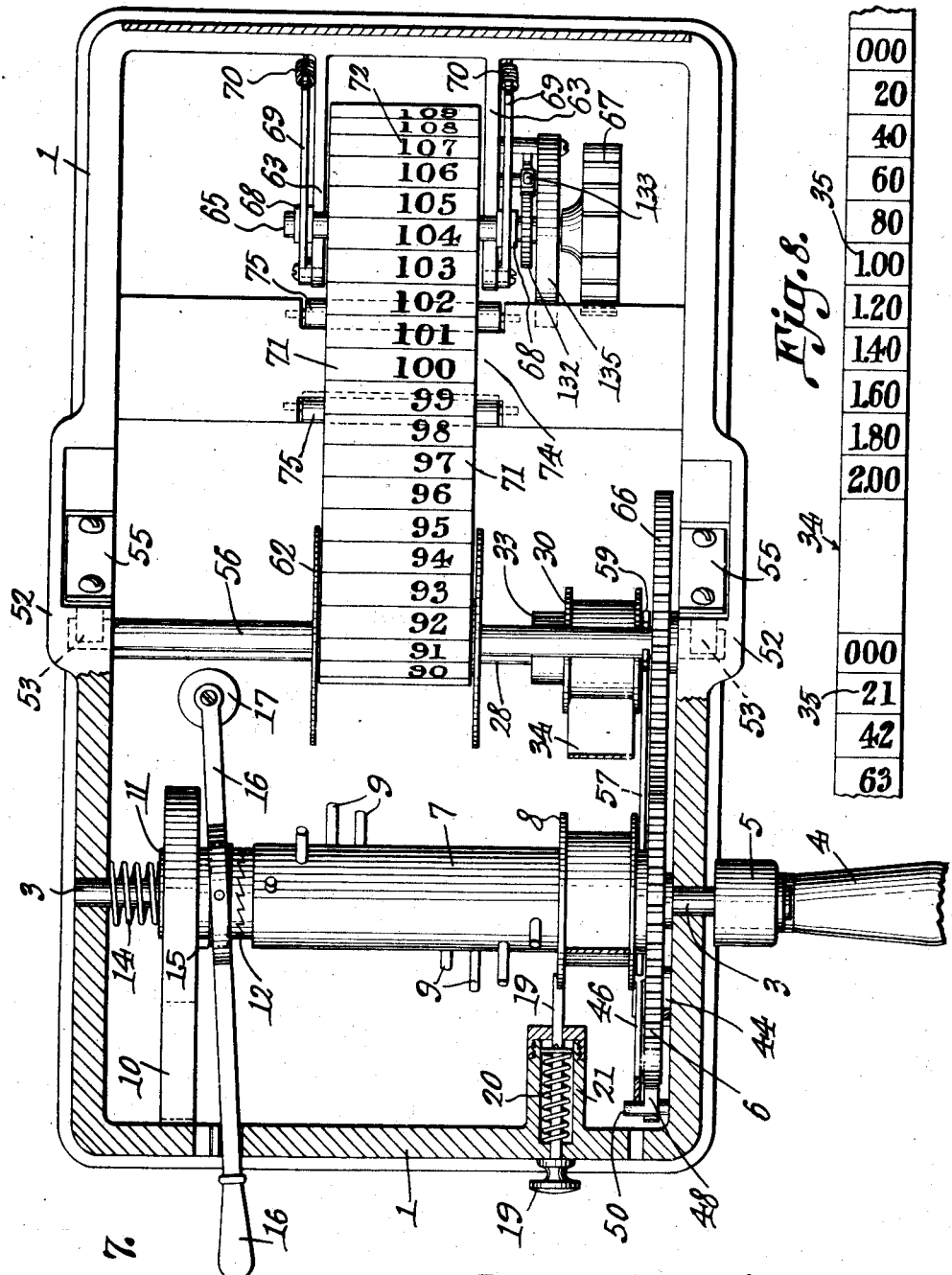

Patented Feb. 1, 1927.

1,615,883

UNITED STATES PATENT OFFICE.

JAMES THOMAS REDDING, OF WILKESBORO, NORTH CAROLINA.

CALCULATOR.

Application filed May 12, 1926. Serial No. 108,549.

This invention aims to provide novel means for computing the price of different numbers of articles at different prices per unit, and to provide novel means whereby a tally or total may be kept of all of the articles sold.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention;

Figure 2 is a vertical sectional detail showing one of the reels and the shaft wherewith the reel cooperates;

Figure 3 is a transverse section, looking toward the rear end of the machine;

Figure 4 is a fragmental top plan showing a portion of the machine at the forward end thereof;

Figure 5 is a vertical longitudinal section;

Figure 6 is a plan showing one of the levers;

Figure 7 is a horizontal section;

Figure 8 is a plan showing one of the tapes.

Figure 9 is a sectional view wherein the signal is disclosed.

The device forming the subject matter of this application comprises a support 1, in the form of a box-like casing. A table 2 projects into the casing from one end thereof, as shown best in Figure 5. A shaft 3 (Figure 3) is journaled for rotation in the side portions of the casing 1 and is located near to the forward end of the casing. The shaft 3 turns freely in a crank 4, so that when the shaft 3 rotates under conditions to be described hereinafter, the crank 4 will not rotate also and injure the operator. The shaft 3 and the crank 4 are connected operatively by a clutch 5, which becomes effective when the crank 4 is pushed to the left in Figure 3, a spring in the clutch serving to disengage the crank 4 from the shaft 3 in a way well understood by those who are familiar with a simple clutch of the sort shown in Figure 3 of the drawings.

A gear wheel 6 and a rotary member or cylinder 7 are secured to the shaft 3. A reel 8 is formed on one end of the rotary member 7, near to the gear wheel 6. Fingers 9 project from the rotary member 7. The fingers 9 are spaced from each other both circumferentially of the rotary member 7 and longitudinally thereof.

The shaft 3 is adapted to be rotated in one direction by means of the crank 4, and is adapted to be rotated in an opposite direction by a spring 10 that is coiled about and secured at one end to a spool 11, the spool being loose on the shaft 3. The outer end of the spring 10 is anchored on the end of the casing 1. The spool 11 and the rotary member 7 have cooperating clutch elements 12. The clutch elements 12 are held interengaged by means of a compression spring 14 disposed about a portion of the shaft 3, as shown in Figure 3, one end of the spring 14 abutting against the side of the casing, and the other end of the spring abutting against the spool 11. The means for shifting the spool 11 to disengage the clutch elements 12 embodies a ring 15 wherein one end of the spool 11 is journaled, the ring 15 being pivoted to the intermediate portion of a lever 16. One end of the lever 16 extends outwardly through the casing 1, so that the lever can be manipulated conveniently, the inner end of the lever 16 being fulcrumed on a post 17 which upstands from the bottom of the casing 1.

There is a seat 18 (Figure 1) in the edge of the reel 8. In the seat 18, the inner end of a slidable detent plunger 19 is engaged. The detent plunger, (Figure 7) slides in a tubular guide 21 on one end of the casing 1 and is advanced by a compression spring 20 located in the guide 21, the detent plunger 19 being accessible at one end from without the casing 1, so that the detent plunger can be pulled out of engagement with the seat 18 in the reel 8, under conditions which will be explained hereinafter.

A plurality of stop plungers 22 are mounted for vertical reciprocation in the upper portion of the casing 1 and in the table 2, as Figures 3 and 5 will show. At their upper ends, the stop plungers 22 are provided with buttons 23 which, as disclosed in Figure 4, have numerals upon them, the numerals in the present embodiment of the invention running from one to ten. Intermediate their ends, the stop plungers 22 are supplied with transverse shoulders 24. The stop plungers 22 are raised by compression springs 25 that abut at their lower ends against the table 2. The upward movement of the stop plungers 22 is limited by securing elements 26 carried by the inner edge of the table 2 and received in elongated slots 27 formed in the lower ends of the stop plungers. There is one of the stop plungers 22 for each of the fingers 9 on the rotatable member 7, and the parts 22 are called stop plungers, because, when they are pushed downwardly, they cooperate with the respective fingers 9 and stop the rotation of the member 7, the reel 8, and the shaft 3.

A shaft 28 is journaled for rotation in the side portions of the casing 1 and is located below and to the rear of the shaft 3. A gear wheel 29 is secured to the shaft 28 and meshes with the gear wheel 6 which is secured to the shaft 3. Noting Figure 5 together with Figure 2, it will be observed that a reel 30 is mounted on the shaft 28. A friction member 31 abuts at one end against the gear wheel 29 and at its other end extends within the reel 30. A compression spring 32 is located within the reel 30. One end of the spring 32 engages the inner wall of the drum 30, and the other end of the spring 32 bears against the friction member 31. The thrust of the spring 32 against the drum or reel 30 is resisted by an abutment 33 on the shaft 28 and engaging the inner end of the reel 30. The friction member 31 and the spring 32 constitute, in substance, a friction clutch which connects the reel 30 with the shaft 28. A tape 34 is wound about the reels 30 and 8. It may be now stated that the friction clutch above referred to permits the reel 30 to slip a little on the shaft 28, depending upon the amount of the tape 34 that is reeled, respectively, on the members 30 and 8, it being observed that the shafts 3 and 28 are constrained to rotate together, since they are connected by the gear wheels 6 and 29, the gear wheel 6 meshing with the gear wheel 29, as shown in Figure 1. Noting Figure 8, it will be observed that there are tables of numerals, shown at 35, on the tape 34. The numerals in the tables 35 are products, derived by multiplying the numerals on the buttons 23 (Figure 4) of the stop plungers 22 by a price per unit, for instance, the price per gallon of gasoline, if the device is used in connection with the dispensing of gasoline. As the tape 34 moves endwise, the numerals at 35 appear one after another at a window 36 which is fashioned in the top of the casing 1, the tape 34 passing across a support 37 and over rollers 38 journaled on the support and located adjacent to the window 36.

Near to its ends, the tape 34 has projections 126 adapted to engage rollers 127 on bell cranks 128 fulcrumed on a bracket 129 and provided with strikers 130 which cooperate with a bell 131 on the support 37. The construction is such that the bell 131 will sound when the tape 34 is nearly unwound from the reels 30 or 8, and the operator thus will be admonished before he has torn the tape from either reel by too much rotation thereof.

The machine includes a lever 39 which is shown in outline in Figure 6. An operating device, preferably a screw 100, is threaded into the casing and may be advanced to swing the lever, as and for a purpose which will be explained hereinafter. Ordinarily, the member 100 is out of engagement with the lever, and the part 100 may be disregarded until it is alluded to specifically hereinafter. The lever 39 comprises a loop-shaped head 40 and side arms 41, the side arms being pivoted at 42 to the table 2. Figure 5 shows that the stop plungers 22 pass downwardly through the loop-shaped head 40 of the lever 39 and the transverse shoulders 24 on the stop plungers 22 overhang the loop-shaped head 40 of the lever 39, so that, when any one of the stop plungers 22 is pressed downwardly, the lever 39 will be swung from its fulcrum points 42. The lever 39 has a lateral projection 43.

Referring to Figure 1, for instance, it will be observed that the upper end of a link 44 is pivoted to the lateral projection 43 of the lever 39, the lower end of the link 44 being pivoted to the intermediate portion of a pawl 45 which engages the gear wheel 6 of the shaft 3, the pawl 45 being pivotally mounted at 45ª on the casing 1. A lever 46 is fulcrumed at 47 on the casing 1, the lever 46 being extended upwardly and outwardly with regard to the casing 1, so that the lever can be manipulated from a point external to the casing. A pawl 48 is pivotally supported at 49 on the casing 1 and has a lateral finger 50 which is located in the path of the lever 46. The pawl 48 is adapted to cooperate with the gear wheel 6. The pawl 48 holds the gear wheel 6 and the shaft 3 against counterclockwise rotation (Figure 1), and the pawl 45 holds the gear wheel 6 and the shaft 3 against clockwise rotation. The pawls 45 and 48 are connected by a retractile spring 51 which constrains them to engage the gear wheel 6.

The side walls of the casing 1 have offsets 52 in which bearings 53 are slidable, the bearings being pressed downwardly and forwardly by springs 54 retained in the offsets by detachable cover plates 55 secured to the side portions of the casing 1. The spring-pressed bearings 53 cooperate with the ends of a shaft 56 carrying a gear wheel 66 which is in mesh with the gear wheel 6, it being possible to slide the shaft 56 backwardly and upwardly, to permit the gear wheel 66 to be disengaged from the gear wheel 6. The means for carrying out the result last-above mentioned embodies a plunger 57 which is slidable in a bracket 58 (Figures 1 and 3) carried by one side wall of the casing 1. At its upper end, the plunger 57 has a fork 59 in which the shaft 56 is received, at a point near to one end of the said shaft. The lower or forward end of the plunger 57 is united by a pin and slot connection 60 with the lower end of the lever 46. There is a compression spring 61 about the lower end of the plunger 57. One end of the spring 61 abuts against the bracket 58, and the other end of the spring abuts against the lever 46 or against the pin of the pin and slot connection 60, the function of the spring 61 being to move the plunger 57 downwardly and forwardly into the position delineated in Figure 1 of the drawings.

Figures 7 and 5 show that a drum 62 is mounted on the shaft 56, the drum 62 receiving one end of a tape 71, the tape 71 having numerals 72 which run from one upwardly to any desired limit. The numerals 72 on the tape 71 appear at a window 73, when the tape is moved endwise, the tape passing over a support 74 and rollers 75 disposed adjacent to the windows 73, as Figure 5 will show. The rear end of the tape 71 is wound about a shaft 65 journaled in seats 64 formed in brackets 63 mounted on one end of the casing 1. The shaft 65 carries a ratchet wheel 132 engaged by a lever pawl 133 fulcrumed on one of the brackets 63. A spring 134 holds the lever pawl 133 engaged with the ratchet wheel 132. A torsion spring 135 is connected at one end to the shaft 65, and at its other end to the aforesaid bracket 63. There is a hand wheel 67 on the shaft 65. The shaft 65 is held removably in the seats 64 by bearings 68 on radius arms 69 pivoted at their inner ends to the brackets 63, retractile springs 70 being connected at their lower ends to the casing 1 and at their upper ends to the radius arms 69, it being possible to cast the springs 70 off the radius arms 69, swing the radius arms 69 upwardly, and release the shaft 65 for removal.

In practical operation, the person in charge of the machine, taking cognizance of the number of gallons of gasoline, for instance, which have been sold, and of the numerals on the buttons 23 of the stop plungers 22, pushes down the appropriate one of the plungers, depending upon the number of gallons sold or dispensed. When the plunger 22 is pushed down, as above described, its shoulder 24 engages the head 40 of the lever 39 and tilts the lever on its fulcrum 42, the link 44 swinging the pawl 45 out of engagement with the gear wheel 6. This permits the shaft 3 and parts carried thereby to be rotated by the crank 4 in the direction of the arrow in Figure 1, the pawl 48 clicking over the wheel 6. When the selected stop plunger 22 is depressed, its lower end comes into the path of one of the fingers 9 on the rotatable member 7.

The shaft 3, the rotatable member 7 and the reel 8 are rotated by means of the crank 4, the crank having been slid to the left in Figure 3, to cause the clutch 5 to couple the crank to the shaft 3. The gear wheel 6 turns the gear wheel 29 together with the reel 30, and the tape 34 is passed from the reel 8 to the reel 30 until the stop plunger 22 which has been depressed, engages the appropriate one of the fingers 9 and arrests the rotation of the member 7. When the tape comes to rest, one of the numerals 35 upon it is disclosed through the window 36, and if the transaction has involved, for instance, the selling of seven gallons of gasoline at 20¢ per gallon, a glance through the window 36 will show that the cost of the gasoline is $1.40. The rotation of the shaft 3 by means of the crank 4 puts the spring 10 under tension.

The operator permits the selected stop plunger 22 to move upwardly, responsive to the spring 25, and the shoulder 24 no longer cooperates with the head 40 of the lever 41 to hold the lever depressed. The spring 51 reacts to engage the pawl 45 again with the gear wheel 6 and to cause the link 44 to raise the lever 41 into the position depicted in Figure 5. The wheel 6 now is held against rotation either forwardly or backwardly.

Observe that prior to this time, the gear wheel 6 and the gear wheel 66 have turned the shaft 56 and the drum 62 to wind a predetermined amount of the tape 71 on the drum 62. This operation causes one of the numerals 72 on the tape 71 to appear at the window 73 and since the numerals 72 run consecutively, the numeral that appears through the window 73 will show the total amount of merchandise which has been sold—a statement which will be more readily appreciated and accepted after the entire description of the operation has been perused.

Up to this point, the operation of the machine has displayed one of the numerals 35 on the tape 32 at the window 36 to indicate the price of the particular invoice of merchandise, and one of the numerals 72 on the tape 71 has been displayed at the window 73, to indicate the total amount of merchandise which has been sold in several transactions: for instance, that ten five gallon sales have been withdrawn from the gasoline tank. Up to this point, moreover, the pawls 45 and 48 are both engaged with the gear wheel 6, thereby locking it. The selected stop plunger 22 has been permitted to rise into its normal position, and it may be assumed that the crank 4 has been permitted to move to the right in Figure 3, so as to disengage the clutch 5 from the shaft 3, thereby preventing the crank 4 from turning and endangering the safety of the operator when the shaft 3 is reversely rotated as hereinafter described.

The lever 46 is tilted on its fulcrum 47. The pin and slot connection 60 raises the plunger 57 against the action of the spring 61, the fork 59 on the plunger moving the shaft 56 at one end and disengaging the gear wheel 66 from the gear wheel 6. On account of this fact, the tape 71, which shows the total number of gallons sold, remains at rest, and no retrograde movement is imparted to it by way of the drum 62, the shaft 56 and the gear wheel 66, when the gear wheel 6 is rotated in a manner now to be set forth.

When the lever 46 is tilted, as foresaid, the lever, engaging the finger 50 on the pawl 48, pulls the pawl out of engagement with the gear wheel 6. The gear wheel now is free to rotate in a direction opposite to that indicated by the arrow in Figure 1, and does so rotate, responsive to the action of the spring 10 on the shaft 3, until the spring-advanced detent plunger 19 engages again in the seat 18 of the reel 8. The operation above described returns to the drum 8, that part of the tape 34 which was reeled off the said drum, and the zero in one of the tables 35 of numerals on the tape 32 appears again through the window 36. The lever 46 is released, the pawls 48 and 45 assume the positions shown in Figure 1, the plunger 57 moves downwardly, the wheel 66 meshes again with the wheel 6, and the parts are restored to the position depicted in Figure 1.

The operation hereinbefore set forth presupposes that all of the merchandise is being dispensed at a stated price per unit; or, getting down to concrete statements, that all of the gasoline has been sold at 20¢ per gallon, as shown in the table at the right hand end of Figure 8. Suppose, however, that the price of gasoline changes to 21¢ per gallon, for instance, and that the operator desires to work with another table, to wit, the 21¢ table at the left hand end of Figure 8. The lever 16 is swung and interengaged with the casing 1, to hold the clutch elements 12 out of engagement. This permits the member 7, the reel 8 and the shaft 3 to be turned without winding up the spring 10 accordingly. The detent plunger 19 is pulled back out of engagement with the seat 18 in the reel 8, and the plunger, therefore, does not interfere with the rotation of the parts 7, 8 and 3. The screw 100 is threaded downwardly, tilting the lever 39, the link 44 disengaging the pawl 45 from the wheel 6. The pawl 45, therefore, does not interfere with the rotation of the parts 6—3—8—7. The lever 46 is tilted on its fulcrum 47, and the plunger 57 disengages the gear wheel 66 from the gear wheel 6. In view of the foregoing, the wheel 66, the shaft 56, and the drum 62 are not operated to shift the position of the totalling tape 71 whilst the tape 34 is being moved to substitute one of the tables 35 for the other. When the lever 46 is operated, the pawl 48 is withdrawn from engagement with the gear wheel 6, and the shaft 3 and the drum 8 now can be rotated by means of the crank 4 to shift the tape 32 endwise, and to substitute one of the price tables 35 for another. By backing out the screw 100, releasing the lever 46, releasing the detent plunger 19, and setting the lever 16 over into the position shown in Figure 7, the machine is restored to a position in which it can operate with a new one of the tables 35 in position.

As the tape 71 is advanced to the left in Fig. 5, the spring 135 (Fig. 7) is put under tension. When the operator desires to reset the tape 71 to a zero position, the gear wheel 66 is disengaged from the gear wheel 6, and the pawl lever 133 is disengaged from the ratchet wheel 132; whereupon the spring 135 will react to rotate the shaft 65 and to rewind the tape 71 on the shaft 65. If the spring 135 breaks, the tape 71 can be rewound on the shaft 65 by turning the shaft through the intrumentality of the hand wheel 67.

What is claimed is:—

1. In a device of the class described, a rotary member including a first reel, a second reel supported for rotation, a price-tape carried by the reels, means for connecting the reels for simultaneous rotation, means under the control of an operator for rotating said member directly to advance the tape to price-indicating position, spring means for rotating said member reversely to retract the tape to initial position, a clutch connecting the spring means with the rotary member, and a movable detent cooperating with the rotary member to limit its rotation responsive to the spring means and to stop the tape in its aforesaid initial position, the clutch being operable to disconnect the spring means and the detent being disengageable from the rotary member, thereby to permit the rotary member to be operated to bring a different portion of the tape into working position.

2. In a device of the class described, a rotary member including a first reel, a second reel supported for rotation, a price-tape carried by the reels, gear wheels forming an operative connection between the reels, a plurality of movably mounted quantity-indicating stops individually under the control of an operator, the rotary member being supplied with circumferentially spaced elements wherewith the stops may be engaged one at a time to limit the rotation of said member and the amount that the tape is moved, means under the control of an operator for rotating said member directly to advance the tape to price-indicating position, spring means for rotating said member reversely to retract the tape to initial position, a detent cooperating with the rotary member to limit its motion responsive to the spring means and to stop the tape in its aforesaid initial position, first and second pawls cooperating respectively with one gear wheel to hold both reels against reverse and direct rotation, means under the control of an operator for disengaging the first pawl from said wheel, and means under the control of any of the stops for disengaging the second pawl from said wheel.

3. In a device of the class described, a rotary member including a first reel, a second reel supported for rotation, a price-tape carried by the reels, gear wheels forming an operative connection between the reels, a plurality of movably mounted quantity-indicating stops individually under the control of an operator, the rotary member being supplied with elements wherewith the stops may be engaged one at a time to limit the rotation of said member and the amount that the tape is moved, means under the control of an operator for rotating said member directly to advance the tape to price-indicating position, spring means for rotating said member reversely to retract the tape to initial position, a detent cooperating with the rotary member to limit its motion responsive to the spring means and to stop the tape in its aforesaid initial position, first and second pawls cooperating respectively with one gear wheel to hold both reels against reverse and direct rotation, means under the control of an operator for disengaging the first pawl from the wheel, a lever mounted for swinging movement and extending into the path of all of the stops, to be operated by any of them, and a link connected to the lever and to the second pawl to disengage it from said wheel when any of the stops is operated.

4. A device of the class described, constructed as set forth in claim 3, and further characterized by the fact that the means for disengaging the first pawl from said wheel embodies a second lever mounted for swinging movement, a fulcrum for the second lever, a pivotal support for the first pawl the first pawl including a part engageable with the second lever, and a pivotal support for the second pawl.

5. In a device of the class described, a gear wheel supported for rotation, means under the control of an operator for rotating the gear wheel directly, spring means for rotating the gear wheel reversely, a lever mounted for swinging movement and under the control of an operator, a first and a second pawl cooperating respectively with the gear wheel to hold the gear wheel against reverse and direct rotation, the lever cooperating with the first pawl to disengage it from said wheel, means for disengaging the second pawl from said wheel, a second gear wheel shiftable into and out of engagement with the aforesaid gear wheel, and means connected with the lever for shifting the second gear wheel as aforesaid, when the lever is operated to disengage the first pawl and to permit reverse rotation of the first-specified gear wheel responsive to the spring means.

6. In a device of the class described, a first gear wheel supported for rotation, means under the control of an operator for rotating the first gear wheel directly, spring means for rotating the first gear wheel reversely, a lever mounted for swinging movement and under the control of an operator, a first and a second pawl cooperating respectively with the first gear wheel to hold said gear wheel against reverse and direct rotation, the lever cooperating with the first pawl to disengage it from the first gear wheel, means for disengaging the second pawl from the first gear wheel, a shaft shiftably mounted and carrying a second gear wheel shiftable with the shaft into and out of engagement with the first gear wheel, and a plunger pivoted to the lever and cooperating with the shaft to shift the shaft and the second gear wheel as aforesaid, when the lever is operated to disengage the first pawl and to permit reverse rotation of the rotary member responsive to the spring means.

In testimony that I claim the foregoing as my own, I have hereto affixed my signature.

JAMES T. REDDING.